United States Patent [19]

Pelzer et al.

[11] Patent Number: 5,652,415
[45] Date of Patent: Jul. 29, 1997

[54] MOLDED ARTICLE DESIGNED TO ABSORB AIRBORNE SOUND

[75] Inventors: Helmut Pelzer, Herdecke-Ende; Tarik Akyol, Witten, both of Germany; Hans Peter Keller, Suhr, Switzerland; Rolf Guenzel, Ahlen, Germany

[73] Assignee: Helmut Pelzer, Herdecke-Ende, Germany

[21] Appl. No.: 433,875

[22] Filed: May 2, 1995

[51] Int. Cl.[6] ........................................ E04B 1/82
[52] U.S. Cl. ................ 181/286; 181/294; 181/295
[58] Field of Search ........................... 181/286, 295, 181/290, 291, 294, 207, 208

[56] References Cited

U.S. PATENT DOCUMENTS

| | | | |
|---|---|---|---|
| 4,149,612 | 4/1979 | Bschorr | 181/286 |
| 4,242,398 | 12/1980 | Segawa et al. | 181/290 X |
| 4,425,981 | 1/1984 | Kiesewetter et al. | 181/286 |
| 4,584,232 | 4/1986 | Frank et al. | 181/294 X |
| 5,410,111 | 4/1995 | Stief et al. | 181/286 |
| 5,521,341 | 5/1996 | Stief et al. | 181/295 |

FOREIGN PATENT DOCUMENTS 4011705  10/1991  Germany.

*Primary Examiner*—Khanh Dang
*Attorney, Agent, or Firm*—Loeb & Loeb LLP

[57] ABSTRACT

A molded article for the absorption of airborne sound, to be used principally in the engine compartment of motor vehicles and particularly as a sound absorber inside partial and complete motor encapsulations, is formed by a porous absorber (1) of which the core (6), being sealed on both sides (7,8) over its complete surface by a respective PU film of a thickness less than 90 μm, is made from an open-pored PU (polyurethane) foam of a thickness of at least 3 mm and about 15 mm at the most. The core comprises cavities (2–4) originating on the bottom face and formed by the injection molding process, said cavities being open only towards the bottom face (5) and having different cavity volumes and different heights (11) measured from the bottom face (5).

11 Claims, 1 Drawing Sheet

MOLDED ARTICLE DESIGNED TO ABSORB AIRBORNE SOUND

BACKGROUND OF THE INVENTION

The invention is directed to a molded article for the absorption of airborne sound, to be used principally in the engine compartment of motor vehicles and particularly as a sound absorber inside partial and complete motor encapsulations.

Molded articles of the above type are known. For instance, DE 40 11 705 C2 discloses a molded article for the absorption of airborne sound of which the side directed to the sound source comprises Helmholtz resonators. The Helmholtz resonators are arranged in such a manner that the adjacent Helmholtz resonators located in the effective range of the respective Helmholtz resonator of a lower frequency, have resonance frequencies different from each other. Said known molded article is provided as a plate absorber which, for forming the integral Helmholtz resonators, is shaped in a corresponding manner, with the openings of the Helmholtz resonators remaining free. For moisture and the like penetrating through the resonator openings, discharge openings are provided. In the context of the instant invention, a plate resonator is understood to be a soft, elastic, areal molded article which, when hit by airborne sound, is activated to undergo natural vibrations, the sound energy being transformed to heat.

The above molded articles have proven useful, but especially the covered frequency range as well as the degree of absorption suffer from inadequacy in many cases or for many cases, respectively. Further, although provisions have been made for drainage of liquids entering the resonators, residues and resultant impairment have been inevitable especially when using the molded article in the engine compartment.

It is an object of the invention to provide a molded article for the absorption of airborne sound which absorbs airborne sound in a consistent manner within a wider frequency range through a longer period of time.

SUMMARY OF THE INVENTION

The above object is solved by a molded article formed by a porous absorber of which the core, being sealed on both sides over its complete surface by a respective polyurethane film of a thickness less than 90 μm, consists of open-pored PU (polyurethane) foam particularly of a minimum thickness of 3 mm and a maximum thickness of about 15 mm. The core, being produced particularly by injection molding, is shaped to comprise a plurality of cavities acting as Helmholtz resonators. The cavities are open only on one of their sides (referred to as base face hereunder), with all of the base faces being arranged in a common plane, i.e. the bottom face of the molded article or the core, respectively. The cavities have different cavity volumes and—measured from the common bottom face—different heights, particularly from a minimum of about 8 mm and a maximum of about 60 mm. Preferably, the height dimensions are ranging from a minimum of about 15 mm and a maximum of about 50 mm.

Preferably, the shape of the walls of the cavities is substantially similar to truncated pyramids. The shape of the base faces of the truncated pyramids is preferably adapted to the predetermined dimensions of the molded article in a manner allowing largest possible coverage. The base faces can have a regular or irregular polygonal shape, preferred use being made of a tetragonal shape, particularly a square or rectangular shape, or, if desired,—particularly in the edge regions—a triangular shape. A number of eight edges, or preferably six edges, should not be exceeded. Preferably, the diameter of the envelope circle laid around the base face is at least about 20 mm and at the most about 200 mm. Preferably, the diameter of the envelope circle around the base face is selected to lie between about 60 mm and about 120 mm, with the inclination of the wall surfaces of the truncated pyramids relative to the vertical line being preferably in the range from about 5° to a maximum of about 30°, or cone angles being selected between about 10° and about 60°.

For protection from intrusion of moisture and liquids, the foamed core of the absorber has both of its sides covered by a PU (polyurethane) film, the thickness of the PU (polyurethane) film being selected such that the entering of sound waves into the foam is practically not hindered. To safeguard this effect, said thickness should be below 90 μm. Thicknesses of the surrounding film between 20 μm and 80 μm have proven useful, while an upper limit of about 60 μm should be observed, if possible. During the production process, the connection between the surrounding films and the foamed core is effected by performing the foaming only after injection of the foam material between the two films.

The above described molded article is preferably mounted on a carrier which can be, e.g., the engine capsule. This can be performed by bonding, although a snap-on connection is preferred to allow easier separation for reuse (recycling).

Preferably, for producing the molded body—as already briefly mentioned—after laying a respective surrounding film against the bottom of the mold and the top of the mold by subjecting the mold to a vacuum force, the mold is closed, and the PU (polyurethane) foam forming the absorber will be injected into the intermediate space between the two films while displacing the existing air volume and will then connect to the films.

The invention will be explained with reference to the embodiment illustrated in the accompanying Figures.

DESCRIPTION OF THE PREFERRED EMBODIMENTS

Figure 1:
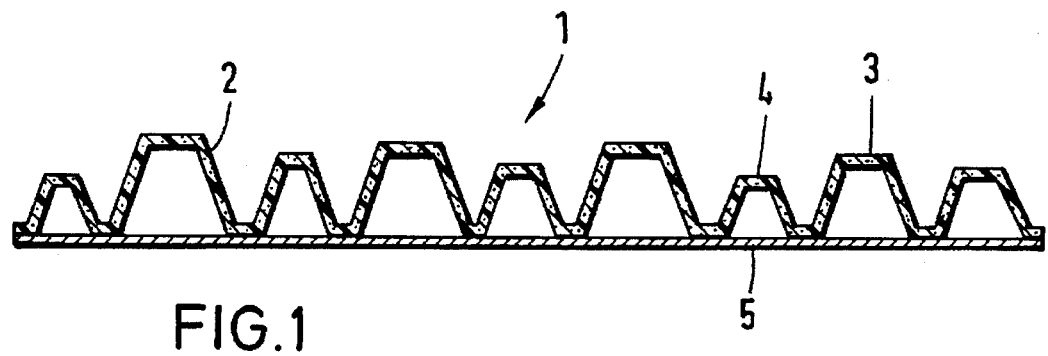
FIG. 1 is a vertical sectional view of a molded article according to the invention arranged on a carrier.

FIG. 1 clearly illustrates the truncated pyramid shape and the different dimensions of the cavities 2,3,4 of the molded article 1. Further, the many possible variations of the walls 6 of the truncated pyramids 2–4, acting as plate resonators, are evident from FIG. 1. The molded article 1, serving as an absorber, is mounted on a carrier 5 arranged on the common bottom face and provided for the base faces of all cavities 2,3,4, and is fastened to said carrier by bonding or, preferably, by a clip connection.

Figure 2:
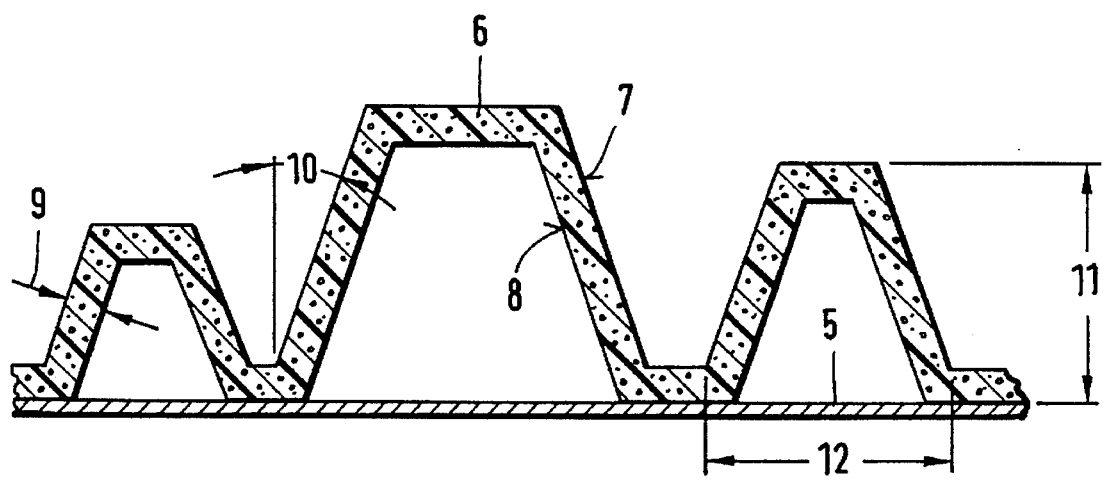
FIG. 2 is an enlarged partial view of FIG. 1.

The enlarged partial view according to FIG. 2 exemplifies the different dimensions mentioned above. While the thickness 9 of the walls 6 should be at least 3 mm but only about 15 mm at the most, the height 11 of the truncated pyramids 2–4 can lie in a maximum range between about 8 mm and 60 mm at the most, but preferably between about 15 mm and about 50 mm. The diameters of the envelope circles surrounding the base faces of the truncated pyramids 2,3,4 can be selected between 20 mm and 200 mm but should preferably be between about 60 mm and about 120 mm. The inclination 10 of the surrounding side walls of the cavities relative to the vertical line with respect to the bottom face (carrier 5) of the molded article 1, is between 5° and 30° and is different for all cavities or groups of cavities.

As illustrated in FIG. 2, the airborne-sound-absorbing core (formed by the plate or wall 6) of the molded article 1 is covered on both sides by a respective polyurethane cover film 7 and 8, preventing the intrusion of liquids while the intrusion of sound waves is not prevented at all or only to a negligible extent.

We claim:

1. A molded article for absorbing airborne sound, comprising:

a porous absorber core having at least two sides and comprising an open-pored polyurethane foam having a thickness between about 3 mm and about 15 mm, a polyurethane film covering each of the at least two sides of the porous absorber, the polyurethane film having a thickness not greater than about 90 µm, the porous absorber core being configured to define a plurality of cavities aligned along and opening toward a common plane, the plurality of cavities comprising at least a first cavity and a second cavity, the first cavity having an end wall spaced a first distance from the common plane, the second cavity having an end wall spaced a second distance from the common plane, the first distance and the second distance being unequal, the first cavity defining a first volume, the second cavity defining a second volume, the first volume and the second volume being unequal.

2. The article of claim 1, wherein at least one of the cavities has a side wall having a truncated conical shape and an end wall spaced from the common plane by a distance of between about 8 mm and about 60 mm.

3. The article of claim 2, wherein the end wall is spaced from the common plane by a distance of between about 15 mm and about 50 mm.

4. The article of claim 1, wherein the cavity defines a substantially polygonal cross section having not more than eight edges.

5. The article of claim 4, wherein the edges of the polygonal cross section coincide with an imaginary envelope circle having a diameter between about 20 mm and about 200 mm.

6. The article of claim 5, wherein the cavity defines a substantially circular cross section having a diameter between about 60 mm and about 120 mm.

7. The article of claim 1, wherein at least one of the cavities has a side wall and the side wall and a line perpendicular to the common plane define an angle between about 10° and about 60°.

8. The article of claim 1, wherein the polyurethane film covering each of the at least two sides of the porous absorber has a thickness between about 20 µm and about 80 µm.

9. The article of claim 8, wherein the polyurethane film covering each of the at least two sides of the porous absorber has a thickness between about 20 µm and about 60 µm.

10. The article of claim 1, comprising a carrier on which the article can be mounted by at least one of a bonding connection and a clip connection.

11. The article of claim 10, wherein the carrier comprises an engine capsule.

* * * * *